INVENTORS
WALTER S. BUSLIK
JAMES A. WEIDENHAMMER
BY Ralph C. Dustin
ATTORNEY

Feb. 19, 1957 W. S. BUSLIK ET AL 2,781,984

TAPE SPEED GOVERNOR

Filed Oct. 26, 1955 2 Sheets-Sheet 2

*INVENTORS*
WALTER S. BUSLIK
JAMES A. WEIDENHAMMER

*BY* Ralph C. Eastin

ATTORNEY 2,781,984

TAPE SPEED GOVERNOR

Walter S. Buslik and James A. Weidenhammer, Poughkeepsie, N. Y., assignors to International Business Machines Corporation, New York, N. Y., a corporation of New York Application October 26, 1955, Serial No. 542,864

5 Claims. (Cl. 242—75)

This invention relates to a speed governing device, and more particularly to a speed governing device for a tape handling machine. While the invention is shown and described in connection with a tape handling machine, it may be used with various machines designed to handle any material in the form of continuous strips, such as paper, film or metal foil.

In machines designed to handle magnetic tape for reading or writing information thereon, it is necessary that the tape be moved at a continuous speed past a read or write head. After the tape has been moved past such a head, it is wound onto a takeup reel. As the tape is wound onto the reel, the effective diameter increases and causes a winding of the tape at a continuously increasing speed if the take-up reel is driven at a fixed speed. In order that the tape may be wound up at a substantially fixed rate, there must be provided a device which operates in response to changes in the tape speed from a desired value to regulate the driving of the take-up reel.

An object of this invention is to provide an improved speed governor for a tape handling machine.

Another object is to provide an improved governor which operates in response to changes in the speed of a tape for controlling the driving of a take-up reel for the tape.

Still another object is to provide a speed governor which operates on slight variations in the speed of a tape to either positively increase or decrease the speed of a take-up reel for the tape.

Yet another object is to provide a speed governor having a pulley over which a tape passes and which is rotatable relative to a supporting shaft for actuating contacts to control the driving of a take-up reel.

Other objects of the invention will be pointed out in the following description and claims and illustrated in the accompanying drawings, which disclose, by way of example, the principle of the invention and the best mode, which has been contemplated, of applying that principle.

Figures 1, 2:
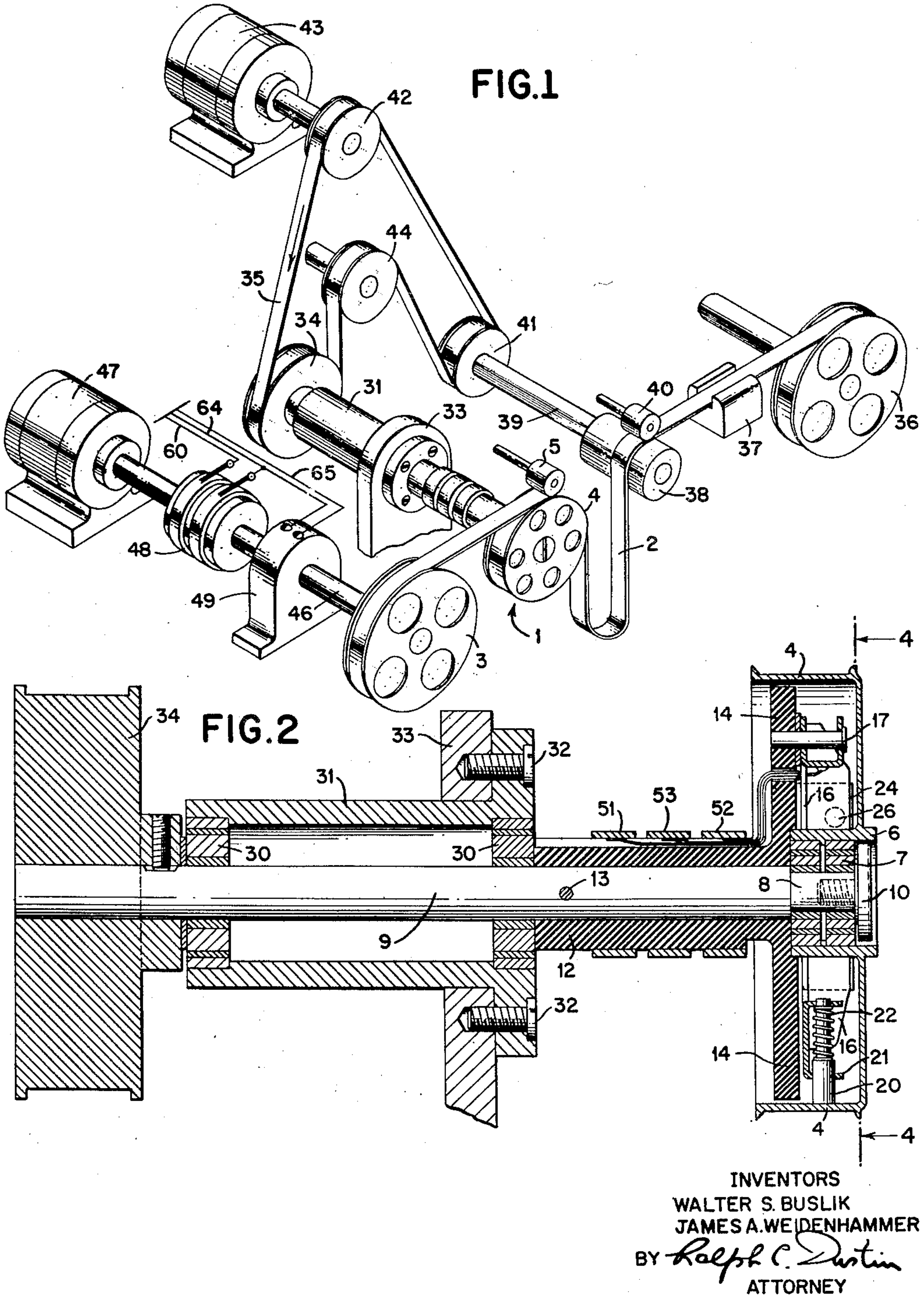
Fig. 1 is a schematic view of a tape handling machine in which the improved speed governor is incorporated.
Fig. 2 is an enlarged sectional view of the speed governor and its driving means.

Referring to the drawings, it will be noted that there is shown in Fig. 1 a speed governor, generally designated 1, operating in response to the movement of a tape 2 for controlling the driving of a take-up reel 3. The tape 2 passes over a drum 4 forming part of the speed governor, and is held in frictional engagement therewith by an idler roller 5.

As shown in Fig. 2, the drum 4 is provided with a hub portion 6 which is supported by bearings 7 mounted on a reduced end portion 8 of a shaft 9. A cap screw 10 threadedly engages the reduced portion 8 for holding the drum 4 in place while permitting the latter to rotate freely relative to the shaft 9. Mounted upon the shaft adjacent the drum 4 is a sleeve shaped member 12 made of any suitable insulating material and fixed to the shaft by a pin 13. Formed integral with the member 12 at its right-hand end is a circular flange portion 14 extending perpendicular to the shaft and lying within the drum 4.

Figures 4, 5:
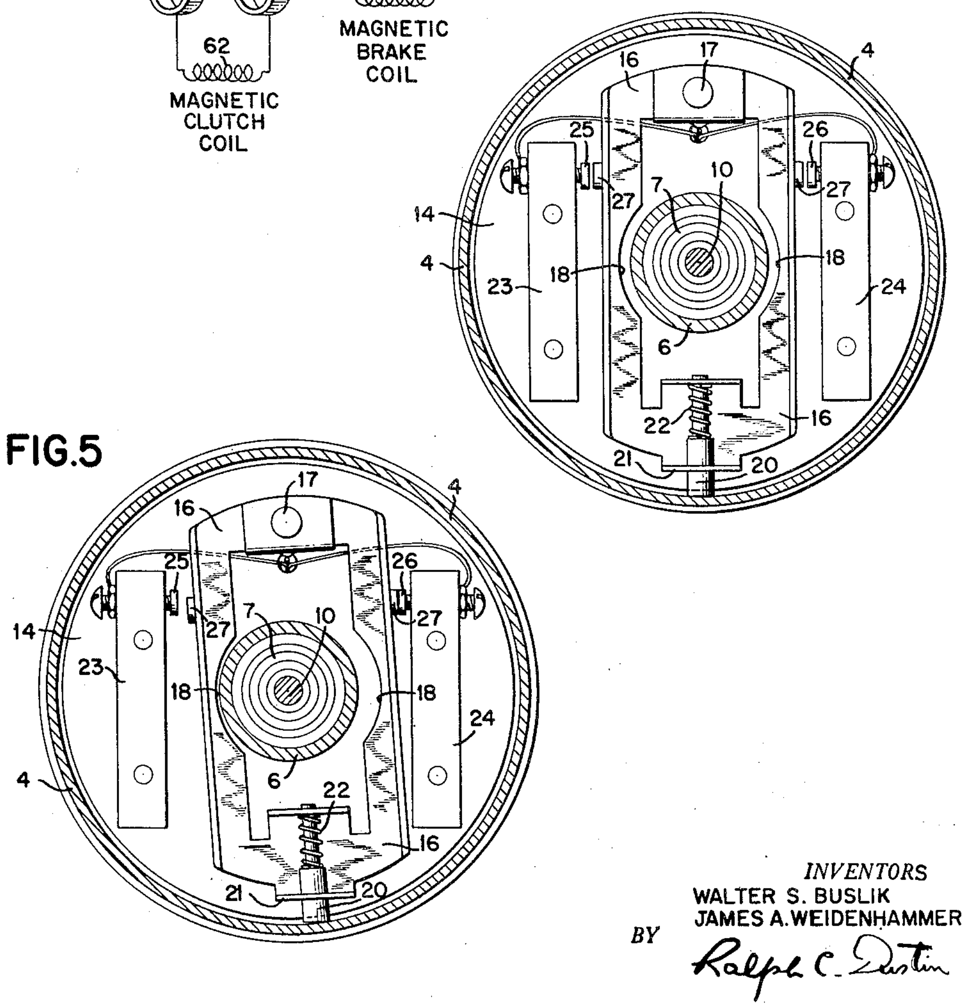
Fig. 4 is a sectional view of the governor taken on the plane of the line 4—4 in Fig. 2.
Fig. 5 is a sectional view like that of Fig. 4 but showing parts in a different position.

At the side of the flange portion 14 adjacent the pulley 4 is a contact member 16, see Fig. 4, in the shape of an open rectangular frame. The upper end of the contact member is pivotally connected to the flange portion 14 by a pin 17, and its sides are cut away at 18 to provide clearances between them and the hub portion 6 of the drum 4 so that the pivotal movement of the contact member may take place. At the lower end of the contact member is a plunger 20 slidably guided within an opening in a flange 21 and urged by a spring 22 into engagement with the inner surface of the drum 4. Mounted upon the flange portion 14 at the sides of the contact member 16 are two blocks 23 and 24 of insulating material carrying contacts 25 and 26 respectively. Fixed to the sides of the contact member 16 is a pair of contacts 27 which engage either the contact 25 or the contact 26 upon pivotal movement of the member 16 from the position shown in Fig. 4.

It will be appreciated that the contact member 16 will remain stationary relative to the contacts 25 and 26 as long as the drum 4 and the shaft 9 rotate in the same direction and at the same speed. While tape is being wound onto the take-up reel 3, the drum 4 will rotate in a counterclockwise direction as viewed in Figs. 1, 4 and 5. During this time, the shaft 9 is driven continuously, by means shortly to be described, in a counterclockwise direction at a fixed speed. If the speed of the drum is greater than that of the shaft 9, the contact member 16 is rocked, due to the frictional engagement between the plunger 20 and the drum 4, about its pivot 17 in a counterclockwise direction until its contact 27 at the right-hand side engages the contact 26, as shown in Fig. 5. When the drum rotates slower than the shaft 9, the contact member 16 rocks in the opposite direction until one of the contacts 27 engage the contact 25. The frictional engagement between the plunger 20 and the drum 4 is only sufficient to cause a rocking of the member 16 and to hold the contact 27 in engagement with either the contact 25 or the contact 26.

The shaft 9 is rotatably supported, as shown in Fig. 2 by bearings 30 carried by a member 31 which is connected by screws 32 to a stationary bracket 33. For driving the shaft 9 there is provided a pulley 34 attached to its left-hand end and having a belt 35 extending about it, as shown in Fig. 1.

The tape 2 is advanced, as shown herein, from a supply reel 36 past a magnetic transducer 37 by a drive capstan 38 fixed to a shaft 39. An idler roller 40 is provided for holding the tape in frictional contact with the drive capstan 38. Fixed to the shaft 39 is a pulley 41 which is also driven by the belt 35. It will be noted in Fig. 1, that the belt is driven by a pulley 42 fixed to the shaft of a synchronous motor 43. In order that the belt may be wrapped about the pulleys 34 and 41 sufficiently to prevent slipping, it is passed over an idler pulley 44 as shown.

Figure 3:
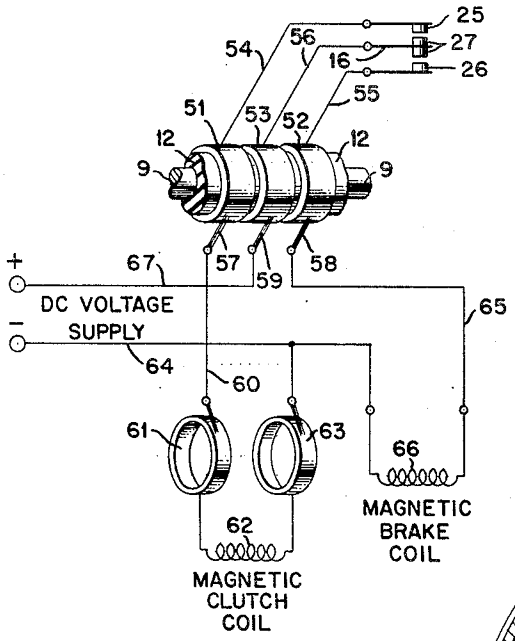
Fig. 3 is a schematic diagram of a circuit controlled by the speed governor.

The take-up reel 3 is fixed to a shaft 46 which is driven by a motor 47 under the control of a magnetic clutch 48 and a magnetic brake 49. The clutch and the brake may be of any commercial design and need not be described in detail herein. It is only necessary that an energizing of the clutch cause the motor 47 to be connected in driving relation with the shaft 46, and an energizing of the brake cause a braking of the shaft 46. The energizing of the clutch and the brake is effected by circuits, Fig. 3, which are controlled by the speed governor 1. To accomplish this, the sleeve shaped member 12 has three slip rings 51, 52, and 53 mounted upon it adjacent the drum 4. The rings 51 and 52 are connected by conductors 54 and 55 to the contacts 25 and 26, while the ring 53 is connected through the contact member 16 to the contacts 27 by a conductor 56. Slidably engaging the slip rings 51, 52, and 53 are brushes 57, 58, and 59 respectively. The brush 57 is connected by a conductor 60 through another brush to a slip ring 61 which is connected to one end of a magnetic clutch coil 62, and the other end of the coil is connected through a slip ring 63 and a conductor 64 to the negative terminal of a D. C. voltage supply. The brush 58 is connected through a conductor 65 and a magnetic brake coil 66 to the conductor 64 leading to the negative supply terminal, and the brush 59 is connected by a conductor 67 to the positive terminal of the voltage supply.

It will be seen that a rotation of the governor drum 4 at a speed slower than that of the shaft 9 will result in the engagement of a contact 27 with the contact 25. This completes a circuit from the positive terminal of the voltage supply through the conductor 67, the brush 59, the slip ring 53, the contacts 27, 25, the slip ring 51, the clutch coil 62, and the conductor 64 to the negative terminal of the supply. An energizing of the coil causes the motor 47 to be clutched to the shaft 46 for driving the reel 3 in a counterclockwise direction in Fig. 1. If the governor drum 4 is rotated at a speed greater than that of shaft 9, one of the contacts 27 engages the contact 26 and completes a circuit from the positive terminal through the slip ring 53, the contacts 27, 26, the slip ring 52, the magnetic brake coil 66, and the conductor 64 to the negative terminal. The energizing of the brake coil causes a braking action to be applied to the shaft 46.

When the tape handling machine is started, a slack in the tape is provided between the speed governor 1 and the drive capstan 38. Assuming that the contact member 16 of the speed governor is in its mid position as shown in Fig. 4, then the magnetic clutch 48 and brake 49 are de-energized and the motor 47 runs free. As the motor 43 operates to drive the pulleys 34 and 41, the shaft 9 turns in a counterclockwise direction relative to the speed governor drum 4 and the capstan 38 rotates to move the tape past the transducer 37. The relative rotation between the shaft 9 and the drum 4 causes the contact 27 to engage the contact 25 and energize the magnetic clutch for connecting the motor 47 to the shaft 46. The speed at which the reel 3 is driven is such that the tape 2 is moved, even when the tape first starts winding onto the reel, at a speed slightly greater than it is moved by the capstan 38 past the transducer 37. The drum 4 for the speed governor is so designed that it rotates at the same speed as the shaft 9 when the tape 2 passes over it at the same speed that the tape is moved by the capstan 38 past the transducer.

Since the movement of the tape by the reel 3 operates to rotate the drum 4 faster than the shaft 9, the contact 27 is moved out of engagement with the contact 25 to de-energize the clutch 48 and disconnect the motor 47 from the reel 3. This causes the reel to slow down and at the same time decrease the speed of the drum until the contact 27 again engages the contact 25 to energize the clutch. As the tape winds onto the reel 3 and increases the effective diameter, the speed of the tape increases each time the reel is driven by energizing the clutch. The speed may eventually become great enough to rotate the drum relative to the shaft 9 an amount sufficient to engage one of the contacts 27 with the contact 26. When this happens, the circuit is completed to energize the brake 49 for braking the rotation of the reel. It will be appreciated that the magnetic clutch is de-energized to disconnect the reel from the motor 47 before this happens. The speed of the tape past the governor 1 will at times be slightly higher or lower than the tape speed past the transducer but the average speed past the governor will be equal to that past the transducer. The slack in the tape between the governor and the capstan 38 is made great enough so that the higher speeds of tape past the governor will never result in a complete taking up of the slack. The reel 3 will, therefore, never place a load on the tape sufficient to break it.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A device for feeding tape at a regulated speed comprising, in combination, a drum over which said tape passes, means supporting said drum for free rotation, a reel having one end of said tape connected thereto, a motor for driving said reel to wind up said tape, electrically operated means for controlling the connection of said motor in driving relation with said reel, a member arranged closely adjacent said drum and carrying electric contact means, means for rotating said member at a constant speed, a contact arm pivotally connected at one end to said member and having frictional engagement at its other end with said drum, said tape acting to rotate said drum as it is wound upon said reel and said drum operating when rotated relative to said member to engage said contact arm with said contact means, and circuit means including said contact arm and said contact means for controlling the energizing of said electrically operated means.

2. The device of claim 1 in which said electrically operated means includes a magnetic clutch which is operative when energized for connecting said motor in driving relation with said reel, and said contact arm engages said contact means to energize said magnetic clutch when said drum rotates at a speed slower than that of said member.

3. A device for feeding tape at a regulated speed comprising, in combination, a drum over which said tape passes, means supporting said drum for free rotation, a reel having one end of said tape connected thereto, a motor for driving said reel to wind up said tape, a magnetic clutch operable when energized for connecting said motor in driving relation with said reel, a magnetic brake operable when energized for braking the rotation of said reel, a member arranged closely adjacent said drum and carrying a pair of electric contacts, means for rotating said member at a constant speed, a contact arm mounted on said member for pivotal movement between said pair of contacts and having frictional engagement with said drum, said tape acting to rotate said drum as it is wound upon said reel and said contact arm operating when said drum is rotated relative to said member to engage one or the other of said pair of contacts and circuit means including said contact arm and said pair of contacts for controlling the energizing of said magnetic clutch and said magnetic brake.

4. The device of claim 3 in which said circuit means includes a pair of circuits, one of which is closed for energizing said magnetic clutch upon rotation of said drum at a speed slower than that of said member and the other is closed for energizing said magnetic brake upon rotation of said drum at a speed greater than that of said member.

5. A device for feeding tape at a regulated speed comprising, in combination, a shaft, means for rotating said shaft at a fixed speed, a drum mounted upon said shaft and rotatable relative thereto, said tape passing over said drum and tending to rotate the latter at a speed proportional to the speed of the tape, a member made of an insulating material and fixed to said shaft for rotation therewith, said member having a flange portion received within said drum, a pair of electric contacts fixed to said flange portion, a contact arm mounted at one end on said flange portion for pivotal movement between said pair of contacts and having frictional engagement at its other end with said drum, a reel having one end of said tape connected thereto, a motor for driving said reel to wind up said tape, a magnetic clutch operable when energized for connecting said motor in driving relation with said reel, a magnetic brake operable when energized for braking the rotation of said reel, a source of D. C. voltage, circuit means for connecting said contact arm to one side of said voltage source, circuit means for connecting one of said pair of contacts through said magnetic clutch to the other side of said voltage source, and circuit means for connecting the other of said pair of contacts through said magnetic brake to said other side of said voltage source.

No references cited.